Sept. 30, 1930.  E. TIMBS ET AL  1,776,937

SLUSH PUMP WATER PRESSURE SHOCK ABSORBER AND BLOW-OFF VALVE

Filed July 25, 1927

Inventor
Edward Timbs
Lewis E. Zerbe
By Lyon & Lyon
Attorneys

Patented Sept. 30, 1930

1,776,937

UNITED STATES PATENT OFFICE

EDWARD TIMBS, OF LOS ANGELES, AND LEWIS E. ZERBE, OF MONETA, CALIFORNIA, ASSIGNORS TO THE NATIONAL SUPPLY COMPANY OF DELAWARE, OF NEW YORK, N. Y., A CORPORATION OF DELAWARE

SLUSH-PUMP WATER-PRESSURE SHOCK ABSORBER AND BLOW-OFF VALVE

Application filed July 25, 1927. Serial No. 208,228.

This invention relates to slush pump water pressure shock absorbers and blow-off valves.

Slush pumps are especially designed for handling slush or rotary mud at high pressures and are used in connection with rotary drilling outfits for pumping the slush through the drill stem to the drill conduit cutter carried by the drill stem. Slush pumps must be designed to withstand relatively high pressures and must also be designed so as to withstand the abrasive action of a liquid laden with grit, sand, and mud. During the operation of such slush pumps, the delivery pipe from the slush pump may for any number of causes become temporarily stopped up so as to place a large back pressure on the pump. Air dome shock absorbers have been used in connection with these slush pumps for the purpose of absorbing these intermittent back pressures, and the principal object of this invention is to provide a water pressure shock absorber which is adapted for use in connection with such a slush pump to absorb pumping shocks incident to the pumping of slush at high pressures through the drill stem of a rotary drilling outfit.

Another object of this invention is to provide a water pressure shock absorber and blow-off valve adapted to be connected with a slush pump.

Another object of this invention is to provide a water pressure shock absorber adapted for use in connection with a slush pump which includes a piston mounted within a shock absorber cylinder and yieldably held in advanced position by means of a spring and which piston also carries a blow-off valve.

Other objects and advantages of this invention will be apparent from the following detailed description of a preferred embodiment thereof, as illustrated in the accompanying drawings.

Figure 1:
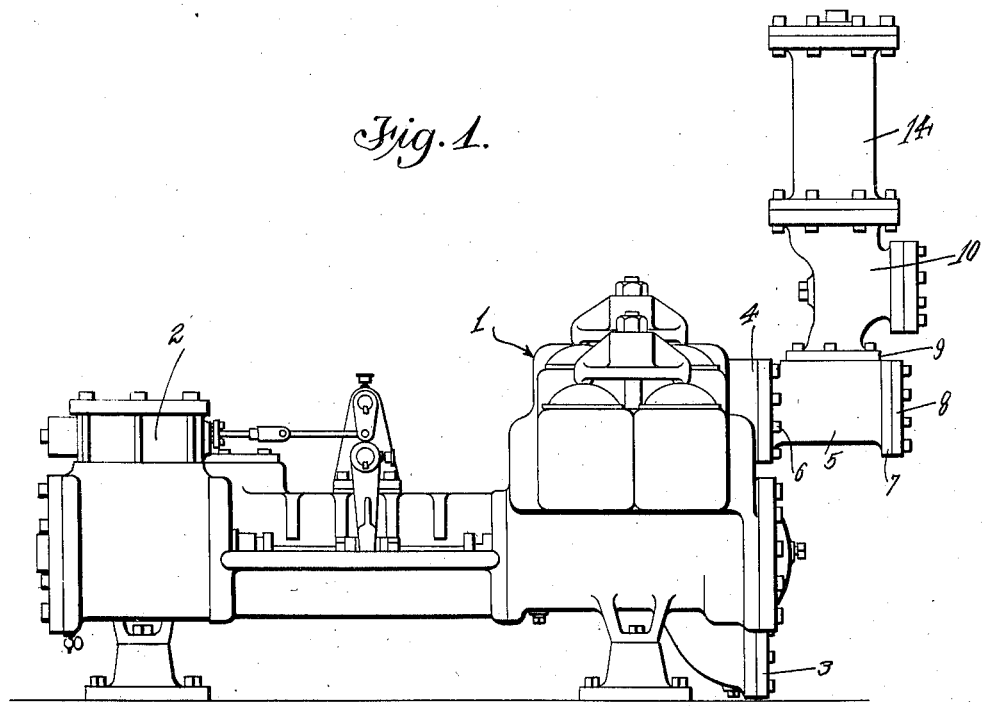
Figure 1 is a side elevation of a slush pump illustrating a water pressure shock absorber and blow-off valve embodying this invention as connected thereto.
Figure 2:
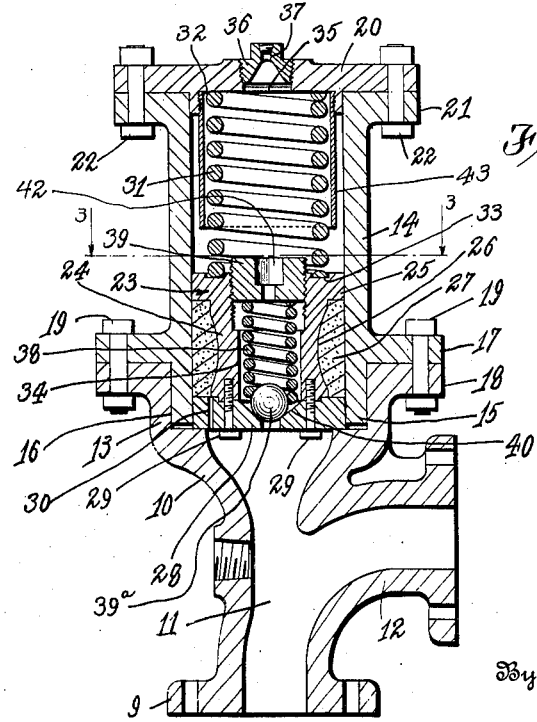
Figure 2 is a sectional side elevation of a water pressure shock absorber and blow-off valve embodying this invention.
Figure 3:
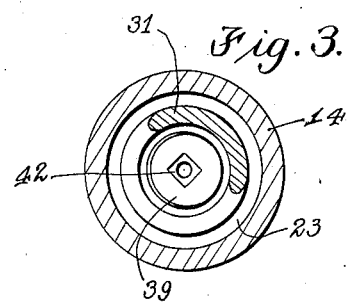
Figure 3 is a sectional view taken substantially on the line 3—3 of Figure 2.

In the preferred embodiment of this invention illustrated in the accompanying drawings, 1 illustrates a slush pump which may be of any suitable or desirable form. The slush pump 1 may be driven by any suitable form of motor or engine 2.

The inlet 3 of the slush pump 1 is connected by means of a conduit (not shown) with any suitable or desirable source of rotary mud or slush. The outlet 4 of the slush pump 1 is connected to a T 5, as illustrated at 6. The branch 7 of the T 5 is capped, as illustrated at 8. Secured to the branch 9 of the T 5 is a T 10 having a restricted passage 11 formed therethrough. The horizontally extending branch 12 of the T 10 is connected by means of a conduit (not shown) with a hydraulic swivel of the rotary drilling outfit. Secured to the branch 13 of the T 10 is a cylinder 14.

The cylinder 14 is formed with an extension 15 which fits within an annular recess 16 formed in the branch 13 of the T 10. Formed integral with the cylinder 14 above the extension 15 thereof is a circumferential flange 17 by means of which the cylinder 14 is secured to the circumferential flange 18 of the T 10, by means of bolts 19. The cylinder 14 is provided at its upper end with a cap 20 which is secured to the circumferential flange 21 of the cylinder 14 by means of bolts 22.

Mounted within the cylinder 14 is a plunger or piston 23 which is preferably of the following construction:

The piston 23 comprises a body 24 having at its upper end an integral circumferential flange 25, which fits closely within the interior of the cylinder 14. The body 24 of the piston 23 is formed with a concaved annular recess 26. Mounted on the body 24 of the piston 23 over the annular recess 26 is a sleeve 27 of packing material. The sleeve 27 is preferably formed of rubber and is of a length greater than the length of the body 24 of the piston 23, so that when the sleeve 27 is compressed to a length equal to the body 24 of the piston 23, the interior portion thereof is compressed into the annular recess 26. The compressing of the packing sleeve 27 into the annular recess 26 insures that there will be maintained a substantial surface contact between the interior periphery of the sleeve 27 and the interior surface of the cylinder 14.

In order to compress the packing sleeve 27 on the body 24 of the piston 23, there is preferably provided a plate 28 which is secured to the end of the body 24 by means of bolts 29. The plate 28 is of approximately the same diameter as the circumferential flange 25 of the body 24. In order to insure the expansion of the packing sleeve 27, there are formed at spaced intervals around the plate 28 longitudinally extending ports 30 which communicate with the passage 11 of the T 10 at one end and communicate with the annular recess 26 formed in the body 24 of the piston 23 at their opposite ends so that the liquid under pressure may flow through the ports 30 and into the annular recess 26 to expand the packing sleeve 27 by fluid pressure.

Means are provided for yieldably holding the piston 23 in advanced position in the sleeve 24, which means preferably comprise a compression spring 31 which is mounted within the cylinder 14 in position to engage the cap 20 at its upper end and the upper end of the body 24 of the piston 23 at its opposite end. The ends of the compression spring 31 fit within recesses 32 and 33 formed in the cap 20 and body 24, respectively.

In order to permit a blow-off from the slush pump 1 or when back pressure is created through the branch 12 of the T 10 in excess of the operative pressure of the slush pump 1, the following means are preferably provided:

Formed through the piston 23 is a passage 34 through which the water or slush under pressure may be discharged through the cylinder 14 and through a port 35 formed in the cap 20 of the cylinder 14. The port 35 is provided with a plug 36 which is screw-threaded into the cap 20 and through which a port 37 of reduced bore is provided. Mounted in the passage 34 is a compression spring 38 which is of greater compression strength than the spring 31. The compression spring 38 engages the plug 39 which is screw-threaded in the body 24 of the piston 23 at its upper end and engages a ball valve 39ª at its lower end, tending to hold the ball valve member 39ª in engagement with a seat 40 formed in the plate 28. The plug 39 is adjustably screw-threaded in the piston 23 to permit the tension in the spring 38 to be adjusted. The adjustment of the spring 38 is for the purpose of permitting an adjustment to be had of the pressure at which the blow-off valve provided by the ball 39ª will open to dissipate pressure from within the T 10. The plug 39 is provided with a square wrench recess 42. A key wrench (not shown) is provided and may be inserted into the cylinder 14 and into the wrench recess 42 when the plug 36 is removed.

A sleeve 43 is provided surrounding the main spring 31. The sleeve 43 acts as a stop for the piston 23 to prevent the fatigue of the main spring by extreme compression. The sleeve 43 is of such length as to prevent the coils of the spring 31 from touching.

The operation of our shock absorber and blow-off valve is:

Normal pressure surges of the fluid or slush being pumped by the slush pump 1 are absorbed by the reciprocation of the piston 23 against the compression spring 31. When the back pressure or pressure surge increases beyond a predetermined amount, the liquid being pumped is permitted to blow-off by raising the ball valve 39 against the compression spring 38 to permit the slush or fluid to pass through the port 34, cylinder 14, and through the port 37 formed in the plug 36.

Having fully described our invention, it is to be understood that we do not wish to be limited to the details herein set forth, which may be varied without departing from the spirit of our invention, as defined by the appended claims.

We claim:

1. In a device of the class described, the combination of a T adapted to be secured to the outlet of a pump, a cylinder secured to one branch of the T, a piston mounted within the cylinder, spring means for yieldably holding the piston in advanced position, a blow-off passage formed through the piston, a ball valve member mounted in the passage, and spring compression means of greater strength than the first said spring means for holding the ball valve member on a seat formed in the passage-way.

2. In a device of the class described, the combination of a cylinder, a piston mounted in the cylinder, spring means for yieldably holding the piston in advanced position, a blow-off valve mounted in the piston, and spring means of greater strength than the first said spring means for yieldably urging the valve means to the closed position.

3. In a device of the class described, the combination of a cylinder, a piston mounted within the cylinder, the piston having an axial passage formed therethrough, means mounted in the cylinder for yieldably holding the piston in the advanced position, a spring mounted in the axial passage formed through the piston, a cap screw-threaded in the axial passage of the piston engaging one end of the spring and having a passage formed therethrough, a valve seat formed in the passage through the piston, and a valve member yieldably held against said seat by the spring.

4. In a device of the class described, the combination of a T adapted to be secured to the outlet of a pump, a cylinder secured to one branch of the T, a piston mounted within the cylinder, a cap removably secured to the other end of the cylinder, a spring mounted between the cap and the piston for yieldably holding the piston in advanced position, a blow-off passage formed through the piston, a valve member mounted in the passage, a ported plug removably secured in the passage formed through the piston, a compression spring mounted between the ported plug and the valve member for holding the valve member on a seat formed in the passage way.

5. In a device of the class described, the combination of a cylinder, a piston mounted within the cylinder, the piston having an axial passage formed therethrough, a cap secured to the cylinder, means interposed between the cap and the piston for yieldably holding the piston in advanced position, a cap removably secured in the passage formed through the piston, a valve member mounted in the passage, a compression spring mounted between the piston cap and the valve member to yieldably force the valve member against a seat formed in the passage way, and the cap removably secured in the passage formed through the piston being adjustably positioned to regulate the pressure exerted by said spring against said valve member.

6. In a device of the class described, the combination of a cylinder, a piston mounted within the cylinder, the piston having an axial passage formed therethrough, a spring mounted in the cylinder for yieldably holding the piston in advanced position, a sleeve mounted in the piston surrounding the yieldable holding means and adapted to limit the movement of the piston in the cylinder, a spring mounted in the axial passage formed through the piston, a cap screw threaded in the axial passage of the piston engaging one end of the spring and having a passage formed therethrough, a valve seat formed in the passage through the piston, and a valve member yieldably held against said seat by the spring.

7. In a device of the class described, the combination of a cylinder, a piston mounted in the cylinder, spring means for yieldably holding the piston in advanced position, a sleeve mounted in the cylinder around the spring to limit the movement of the piston in the cylinder; a blow-off valve mounted in the piston, and a spring means of greater strength than the first said spring means for yieldably urging the valve means to the closed position.

Signed at Torrance, Calif., this 18th day of July, 1927.

EDWARD TIMBS.
LEWIS E. ZERBE.